Jan. 1, 1952 E. S. SCANLON 2,580,604
SHUTTER CONTROLLING DEVICE
Filed Nov. 29, 1950
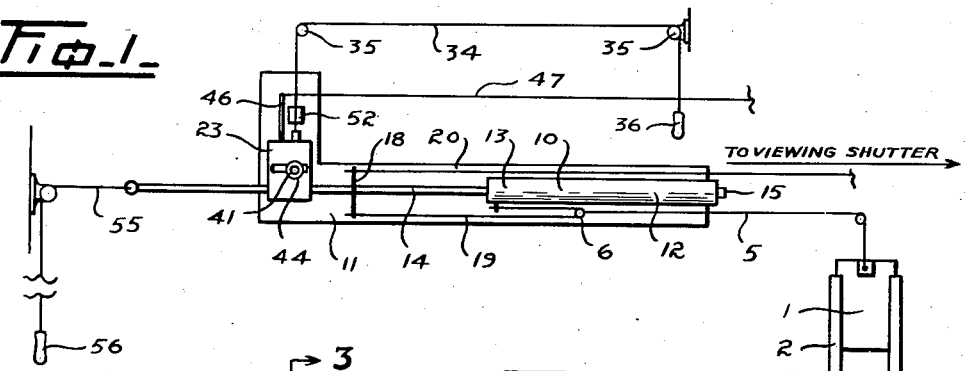
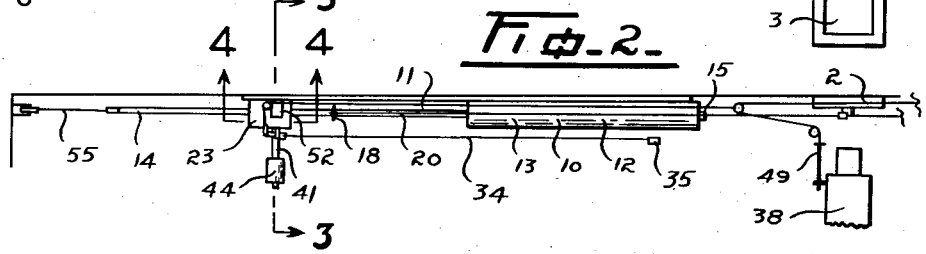
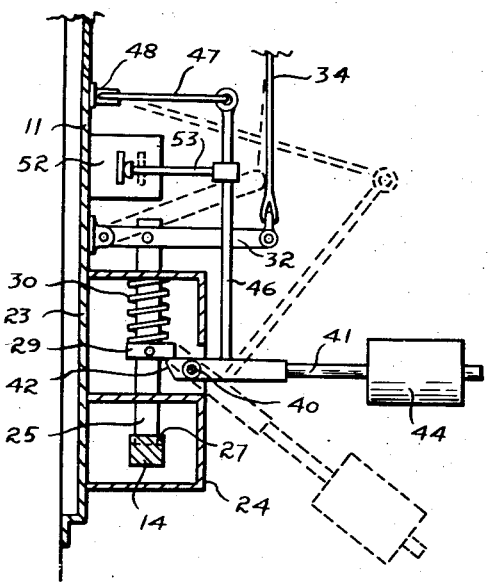
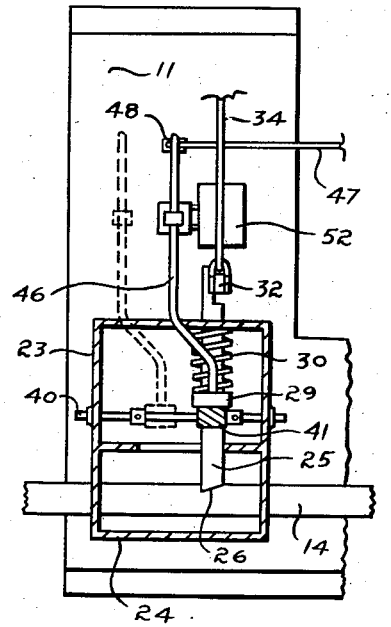
INVENTOR
EWART STANWAY SCANLON
ATTORNEY Patented Jan. 1, 1952

2,580,604

UNITED STATES PATENT OFFICE 2,580,604

SHUTTER CONTROLLING DEVICE

Ewart Stanway Scanlon, Vancouver,
British Columbia, Canada

Application November 29, 1950, Serial No. 198,057
In Canada August 22, 1949

2 Claims. (Cl. 268—58)

My invention relates to improvements in shutter controlling devices which are particularly adapted for the manual and automatic closing of the projector and viewing shutters in a wall of a projector booth in cinemas or theatres.

Hitherto accidents have occurred to employees as a shutter has dropped to close and the normal impact shock of a shutter closing is apt to cause damage to shutter frames, furthermore the noise of impact on the closing of one or more shutters in case of fire is apt to frighten an audience and cause panic.

With the use of the present invention all the above mentioned objections are overcome and means are also provided for conveniently dropping all the shutters manually as desired and also for resetting them in open position prior to a further showing of films. A still further object is to provide a controlling device which may be installed in a position remote from the fire hazard of the projectors, so that the operating mechanism cannot be impaired by fire until its work of closing the shutters is fully completed.

Referring to the drawings:

Figure 1 is an elevational view showing the invention.

Figure 2 is a plan view.

Figure 3 is an enlarged sectional view of the latch mechanism taken on the line 3—3 of Figure 2.

Figure 4 is an enlarged sectional view of the latch mechanism taken on the line 4—4 of Figure 2.

In the drawings like characters of reference indicate corresponding parts in each figure.

The numeral 1 indicates generally a projector shutter having sliding movement in a frame 2, which frame is set to close an opening 3 in the front wall of a projection booth. The shutter 1 is mounted to close by gravity in the usual way as soon as released and is connected at its upper end with a cord 5 which is fitted at its outer end with a sheave 6.

The control device 10 is for convenience of manufacture and assembly, mounted on a panel 11 which supports an elongated dash pot 12 having a cylinder 13 provided with a piston (not shown) fitted with a rod 14, which rod extends from one end of said dash pot. The cylinder 13 is provided at its closed end with a relief valve 15 by which the speed of movement of the piston in a shutter closing direction may be regulated. The piston rod 14 is provided with a cross arm 18 the outer ends of which are provided with cord connections 19 and 20. The cord connection 19 is looped intermediate its length to surround the sheave 6 on the cord 5. The remote end of the cord 19 is attached to the open end of the cylinder 13 or other convenient part of the device. The cord connection 20 leads directly from the cross arm 18 to a viewing shutter indicated in Figure 1 but not shown. The vertical length of the projector shutter is usually one-half of that of the viewing shutter, so that by using a single line pull on the viewing shutter and a one to two purchase on the projector shutter 1 both shutters move to full open or closed position in the same length of time.

The numeral 23 indicates a release mechanism consisting of a casing 24 through which the free end of the piston rod 14 slidably extends, see details in Figures 3 and 4. Slidably mounted in the casing 23 is vertical bolt 25 having an inclined latch 26 at its lower end which is adapted to engage a corresponding indent 27 formed in the upper surface of the piston rod to hold said piston rod extended and support the viewing shutter and the projector shutter 1 in full open position, as shown in the drawings. The bolt 25 is provided with a collar 29 upon which a compression spring 30 bears to urge the latch 26 into the indent 27. A lever 32 is pivotally supported above the casing 24 and engages the bolt 25 to raise it to release the piston rod. This lever is preferably fitted with a pull cord 34 which is entrained over suitable pulleys 35 and fitted with a hand grip 36 disposed at any position convenient to the operator and his projector 38, so that he can, by pulling on said handle, release the piston rod 14 and allow the shutters to close. A horizontal shaft 40 extends across the casing 24 and slidably and rockably mounted thereon is a lever 41, said lever having a latch 42 at its inner end normally engaging the collar 29, as shown in detail in Figures 3 and 4. A counterweight 44 is fitted upon said lever to trip it when released from its horizontal position. The lever 41 is provided with a normally vertical arm 46 connected at its upper end by a flexible cord or cable 47 which extends over suitable pulleys 48 to a fusible link 49 attached to a suitable anchorage near the projector 38. Obviously where there are two or more projectors in use a fusible link will be located close to each of them and the cable hook up between them and the lever 46 will be such that the fusing of any of the links will enable the counterweight to swing the lever 41 and its arm 46 freely and allow the latch 42 to lift the bolt 25 and disengage the latch 26 from the indent 27 so that the shutters can fall by gravity and move the piston rod 14 into the cylinder 12. The closing speed of the shutters will be regulated as desired by manipulation of the relief valve 15.

If it is desired to shut off the current supply to the projection booth exhaust fan (not shown) coincidentally with the fusing of any of the fusible links 49, a spring loaded normally closed main switch 52 is mounted above the casing 24 and a push rod 53 is fitted upon the arm 46 which will bear upon the switch 52 to keep it closed as long as the arm 46 is in its normal vertical position.

The free end of the piston rod 14 is fitted with a pull cord 55 and a hand grip 56 by which the piston can be returned to latched position as shown and the shutters opened ready for the projectors to be again operated.

To reset the device with the shutters open, after closing has been effected through fire, or the fusing of the fusible link or links 49, it is necessary to first replace the fused link then slide the lever 41 to the left or to the position indicated in dotted line in Figure 4. The piston rod 14 is then withdrawn by pulling on the hand grip 56 until the indent 27 on the piston rod registers with the bolt 25 when its latch 26 will drop into said indent and hold the piston rod in its outer position and the shutters are moved to full open position. The completion of the resetting movemen is effected by raising the lever 41 to slightly above the horizontal and then sliding said lever back to normal position upon the horizontal shaft 40 so that the latch 42 can again bear upwardly under the collar 29, the replaced fusible link is then secured to its anchorage and the device is again ready to function by manual effort or automatically as above described.

What I claim as my invention is:

1. A device for controlling the opening and closing movement of a shutter, said device comprising a dash pot cylinder having a piston and piston rod, said dash pot serving to restrain the piston movement in one direction, a cord extending from an end of the piston rod connected to said shutter to hold it in open position, a spring pressed latch normally engaging the piston rod to hold it in extended position, a tripping lever pivotally mounted to engage a part of the spring pressed latch, said lever being weighted to lift the spring pressed latch, a second cord attached to the lever to support it, said cord having a fusible link attached thereto and anchored in a fire hazard zone whereby the disruption of the link frees said weight to swing the lever and to release the spring pressed latch from the piston rod.

2. A device for controlling the opening and closing movement of a projection booth shutter as claimed in claim 1 and manually operable means for tripping the latch without disturbing the tripping lever.

EWART STANWAY SCANLON.

REFERENCES CITED

The following references are of record in the file of this patent:

UNITED STATES PATENTS

| Number | Name | Date |
| --- | --- | --- |
| 1,130,079 | Fox | Mar. 2, 1915 |
| 1,608,133 | Mears | Nov. 23, 1926 |
| 1,897,708 | Mastrom | Feb. 14, 1933 |

FOREIGN PATENTS

| Number | Country | Date |
| --- | --- | --- |
| 273,630 | Germany | May 2, 1914 |